United States Patent
Akasaka

(10) Patent No.: US 6,996,308 B1
(45) Date of Patent: Feb. 7, 2006

(54) POLARIZATION MODE DISPERSION OUTAGE MITIGATION

(75) Inventor: Youichi Akasaka, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 28 days.

(21) Appl. No.: 10/882,742

(22) Filed: Jul. 1, 2004

(51) Int. Cl.
G02B 6/28 (2006.01)
(52) U.S. Cl. .......................................... 385/24; 385/27
(58) Field of Classification Search ..................... None See application file for complete search history.

(56) References Cited

U.S. PATENT DOCUMENTS 6,781,679 B1 * 8/2004 Richards et al. ........... 356/73.1

* cited by examiner

*Primary Examiner*—Frank G. Font
*Assistant Examiner*—Michael P. Mooney

(57) ABSTRACT

A method is disclosed of handling a Polarization Mode Dispersion (PMD) outage for optical signals on an optical fiber route between an optical transmitter and an optical receiver. The method comprises: determining that the PMD outage has occurred on the optical fiber route; in response to determining that the PMD outage has occurred, determining if the PMD outage is wavelength dependent; and in response to determining that the PMD outage is wavelength dependent, adding a wavelength converter to the optical fiber route, wherein the wavelength converter converts one of the optical signals from an optical wavelength affected by the PMD outage to a different optical wavelength.

12 Claims, 6 Drawing Sheets

POLARIZATION MODE DISPERSION OUTAGE MITIGATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication systems that mitigate outages caused by polarization mode dispersion.

2. Description of the Prior Art

Optical fibers are used to carry large amounts of communication traffic throughout the world. In a typical configuration, an optical transmitter is connected to an optical receiver by an optical fiber. The optical transmitter receives a communication signal and emits light pulses that represent the communication signal into the optical fiber. The light pulses propagate within the optical fiber from the optical transmitter to the optical receiver. The optical receiver detects the light pulses and provides the corresponding communication signal.

In many cases, the optical transmitter and receiver comprise Wavelength Division Multiplex (WDM) devices that simultaneously transmit and receive light pulses at multiple optical wavelengths. With WDM, the optical transmitter simultaneously receives multiple communication signals and simultaneously emits corresponding light pulses at different optical wavelengths, where each communication signal uses a different optical wavelength. The optical receiver separates the light pulses by wavelength to differentiate the communication signals. Thus, multiple communication signals may be simultaneously transferred over an optical fiber at different respective wavelengths.

The optical fiber attenuates the optical pulses as they traverse the fiber. This attenuation is sometimes referred to as loss that can be quantified in decibels. To prevent attenuation from destroying the optical pulses, discrete optical amplifiers are inserted in between the optical transmitter and receiver on long fiber routes. The discrete optical amplifiers boost the power of the optical pulses, so the optical receiver may properly detect the pulses and provide the corresponding communication signal. Unfortunately, these discrete optical amplifiers also introduce noise into the light pulses and amplify pre-existing noise.

If the discrete optical amplifiers cannot sufficiently boost the light pulses to overcome the attenuation, then a regenerator site must be installed in the middle of the optical fiber route. The regenerator site requires WDM equipment to convert each wavelength to an electrical signal. The regenerator site requires expensive line cards to condition the electrical signals. The regenerator site requires additional WDM equipment to regenerate the wavelengths from the conditioned electrical signals.

Distributed Raman amplifiers also boost the power of light pulses on an optical fiber. The distributed Raman amplifier pumps additional light onto the fiber—sometimes in the opposite direction of the light pulses that represent the communication signal. Under the right conditions, energy from the pumped light is transferred through the optical fiber structure to the light pulses that represent the communication signal. Noise generated by the Raman amplifier is attenuated by fiber loss as well as signal power. Thus, the distributed Raman amplifiers could have better Optical Signal to Noise Ratio (ONSR) than discrete amplifiers.

Recently, optical wavelength converters have been developed. The optical wavelength converters receive light pulses at a first wavelength and transmit corresponding light pulses at a different wavelength. The optical converters also remove some of the noise introduced or amplified by the discrete optical amplifiers. As a result, the converted pulses could have a higher OSNR.

The optical fibers may degrade the light pulses due to a fiber impairment called Polarization Mode Dispersion (PMD). When PMD exists, the optical fiber propagates different polarization modes of the light pulse at different speeds. Note that although the speed of light in a vacuum is constant, optical fibers are typically not in a vacuum, so the speed of light in an optical fiber can vary. As the light pulse propagates down an optical fiber that exhibits PMD, the optical pulse spreads out in time and lessens in amplitude, since the polarization modes of the optical pulse travel at different speeds. The faster mode of the pulse takes the lead and slower mode of the pulse falls behind. By the time that the optical pulse reaches the optical receiver, the ideal square wave shape of the pulse may resemble more of an elongated bump. When PMD is severe, the optical pulse spreads to the point of being unrecognizable. The optical receiver cannot accurately detect these unrecognizable light pulses, and as a result, the optical receiver provides a recovered communication signal with significant bit errors. If the Bit Error Rate (BER) reaches a set threshold, then a PMD outage has occurred. To avoid PMD outages, higher OSNR is required.

Unfortunately, optical wavelength converters and distributed Raman amplifiers have not been effectively deployed to mitigate PMD outages.

SUMMARY OF THE INVENTION

Some examples of the invention include a method of handling a Polarization Mode Dispersion (PMD) outage for optical signals on an optical fiber route between an optical transmitter and an optical receiver. The method comprises: determining that the PMD outage has occurred on the optical fiber route; in response to determining that the PMD outage has occurred, determining if the PMD outage is wavelength dependent; and in response to determining that the PMD outage is wavelength dependent, adding a wavelength converter to the optical fiber route, wherein the wavelength converter converts one of the optical signals from an optical wavelength affected by the PMD outage to a different optical wavelength.

In some examples of the invention, the method further comprises: determining if the PMD outage is still present after adding the wavelength converter; and in response to determining that the PMD outage is still present after adding the wavelength converter, adding a distributed Raman amplifier to the optical fiber route, wherein the distributed Raman amplifier uses a Raman effect to amplify the optical signals.

In some examples of the invention, the method further comprises: determining if the PMD outage is still present after adding the distributed Raman amplifier; and in response to determining that the PMD outage is still present after adding the distributed Raman amplifier, adding another distributed Raman amplifier to the optical fiber route.

In some examples of the invention, the method further comprises: in response to determining that the PMD outage is not wavelength dependent, adding a distributed Raman amplifier to the optical fiber route, wherein the distributed Raman amplifier uses a Raman effect to amplify the optical signals.

In some examples of the invention, the optical fiber route is comprised of a plurality of optical fibers coupled together by a plurality of optical amplifiers to form the optical fiber route between the optical transmitter and the optical receiver, and wherein adding the distributed Raman amplifier to the optical fiber route comprises determining one of the optical fibers having a highest loss and adding the distributed Raman amplifier to the one optical fiber having the highest loss.

In some examples of the invention, adding the wavelength converter to the optical fiber route comprises adding the wavelength converter proximate to the optical receiver.

In some examples of the invention, the wavelength converter reduces noise in the optical signal.

In some examples of the invention, adding the wavelength converter to the optical fiber route comprises determining the optical wavelength affected by the PMD outage and configuring the wavelength converter to convert the one optical signal from the optical wavelength affected by the PMD outage to a different optical wavelength.

In some examples of the invention, the optical fiber route operates at 10 gigabits per second or higher.

In some examples of the invention, the optical fiber route operates at 40 gigabits per second or higher.

BRIEF DESCRIPTION OF THE DRAWINGS

The same reference number represents the same element on all drawings.

DETAILED DESCRIPTION OF THE PREFERRED EMBODIMENT

FIGS. 1–6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
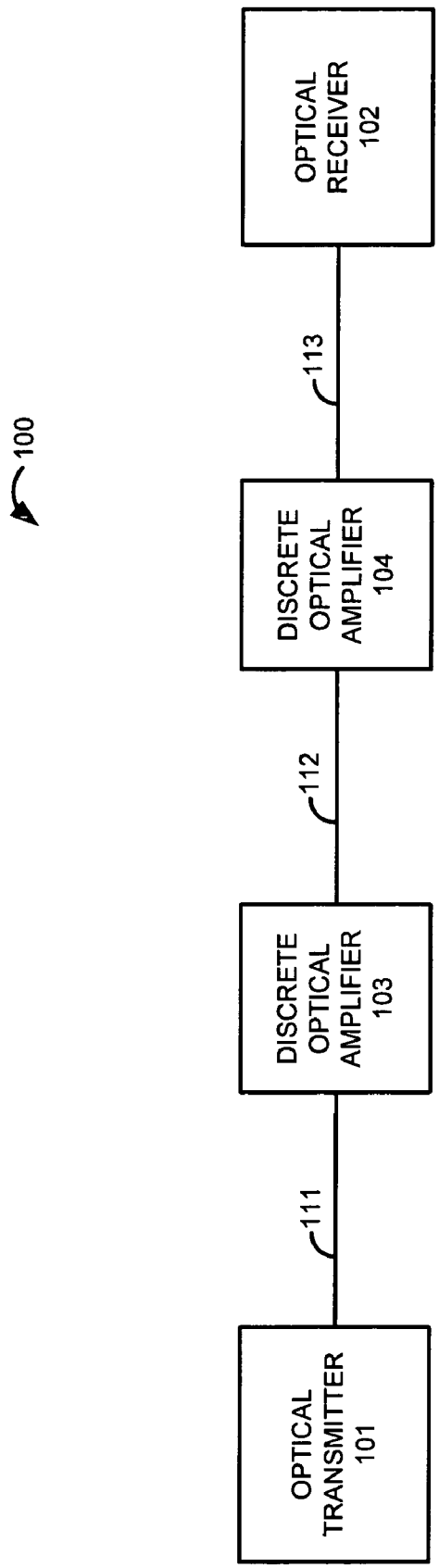
FIG. 1 illustrates an optical fiber route in an example of the invention.

FIG. 1 illustrates optical fiber route 100 in an example of the invention. Optical fiber route 100 includes optical transmitter 101, optical receiver 102, discrete optical amplifiers 103–104, and optical fibers 111–113. Optical fiber 111 couples optical transmitter 101 to discrete optical amplifier 103. Optical fiber 112 couples discrete optical amplifier 103 to discrete optical amplifier 104. Optical fiber 113 couples discrete optical amplifier 104 to optical receiver 102. Those skilled in the art will appreciate that additional components may be installed on fiber route 100, but these additional components are omitted for clarity.

Optical transmitter 101 uses WDM to simultaneously transmit multiple optical signals at different wavelengths over optical fiber 111. Discrete optical amplifier 103 receives the optical signals from optical fiber 111, amplifies the optical signals, and transfers the amplified optical signals to optical fiber 112. Discrete optical amplifier 104 receives the optical signals from optical fiber 112, amplifies the optical signals, and transfers the amplified optical signals to optical fiber 113. Optical receiver 102 uses WDM to simultaneously receive multiple optical signals at different wavelengths over optical fiber 113.

Unfortunately, discrete optical amplifiers 103–104 (and possibly other components) add noise to the optical signals. In addition, optical fibers 111–113 cause PMD that becomes severe enough to result in a PMD outage.

Figure 2:
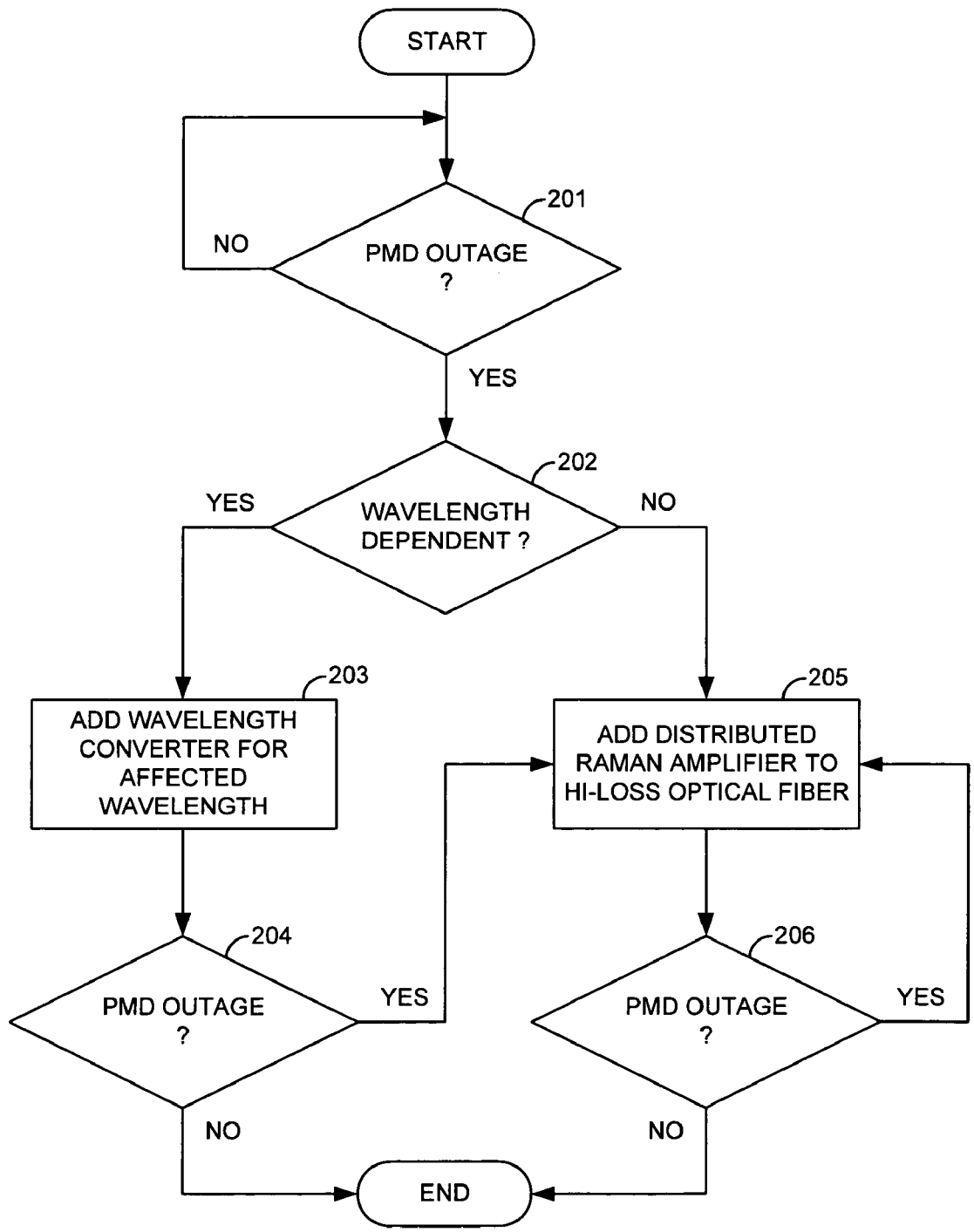
FIG. 2 illustrates a method of mitigating a PMD outage in an example of the invention.

FIG. 2 illustrates a method of mitigating a PMD outage in an example of the invention. In step 201, optical fiber route 100 is monitored for PMD outages. PMD outages are more prevalent on high-bandwidth optical fiber routes in the gigabit per second range, such as 10 or 40 gigabit per second routes. If a PMD outage occurs at step 201, then a determination is made if the PMD outage is wavelength dependent at step 202. If the PMD outage is wavelength dependent at step 202, then optical wavelength converter 105 is added to the optical fiber route at step 203 (See FIG. 5). Typically, wavelength converter 105 is added to optical fiber route 100 proximate to optical receiver 102. After step 203, optical fiber route 100 is monitored to determine if the PMD outage is still present at step 204. If the PMD outage is not present at step 204, then the method ends.

Figure 6:
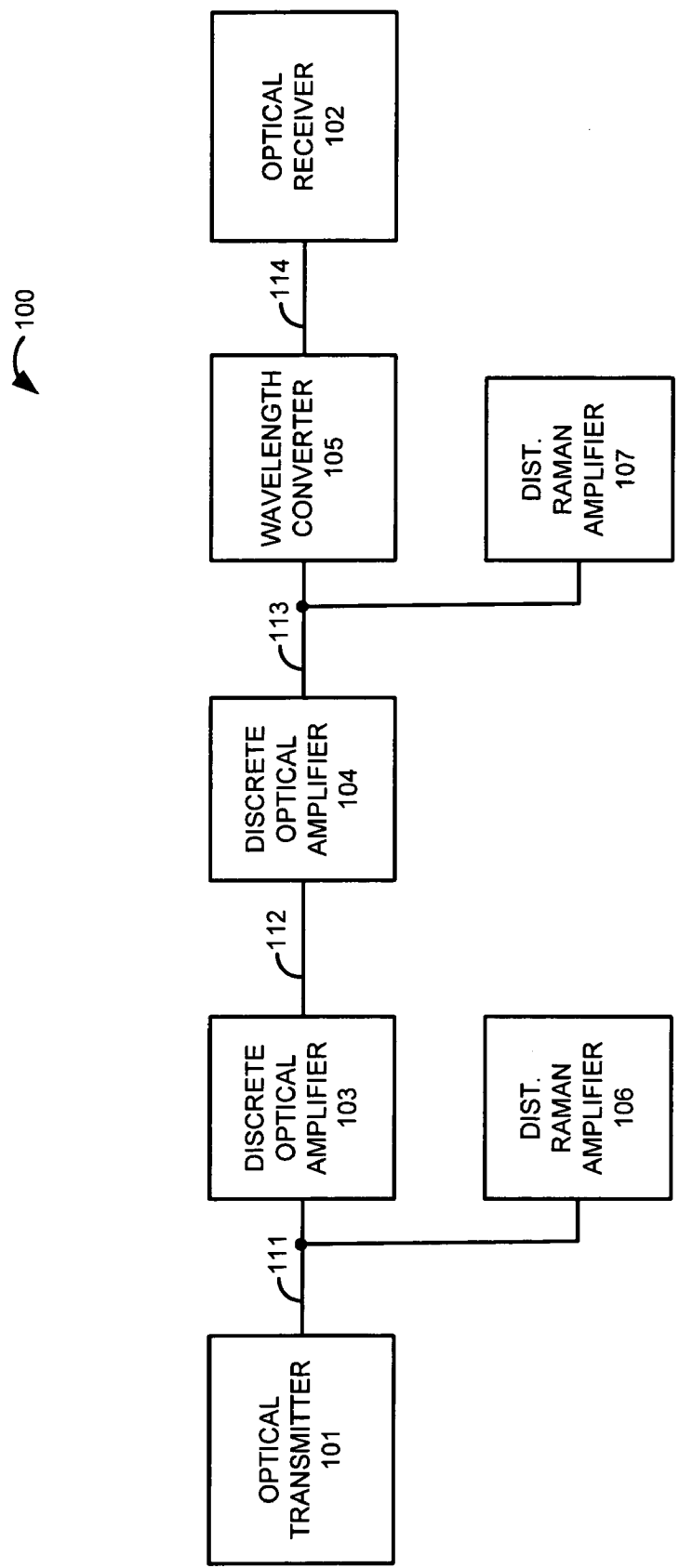
FIG. 6 illustrates an optical fiber route in an example of the invention.

If the PMD outage is still present at step 204, or if the PMD outage is not wavelength dependent at step 202, then distributed Raman amplifier 106 is added to optical fiber route 100 at step 205 (See FIG. 6). Typically, distributed Raman amplifier 106 is added to the optical fiber that has the highest loss on optical fiber route 100. In this example, optical fiber 111 has the highest loss, so distributed Raman amplifier 106 is coupled to optical fiber 111. After step 205, optical fiber route 100 is monitored to determine if the PMD outage is still present at step 206. If the PMD outage is not present at step 206, then the method ends. If the PMD outage is still present at step 206, then the method returns to step 205.

In this example, the PMD outage is still present at step 206, so another distributed Raman amplifier 107 is added to optical fiber route 100 at step 205 (See FIG. 6). Typically, the second distributed Raman amplifier 107 is added to the optical fiber that has the second highest loss on optical fiber route 100. In this example, optical fiber 113 has the second highest loss, so distributed Raman amplifier 107 is coupled to optical fiber 113. After step 205, optical fiber route 100 is monitored to determine if the PMD outage is still present at step 206. If the PMD outage is not present at step 206, then the method ends. If the PMD outage is still present at step 206, then the method returns to step 205.

Figure 3:
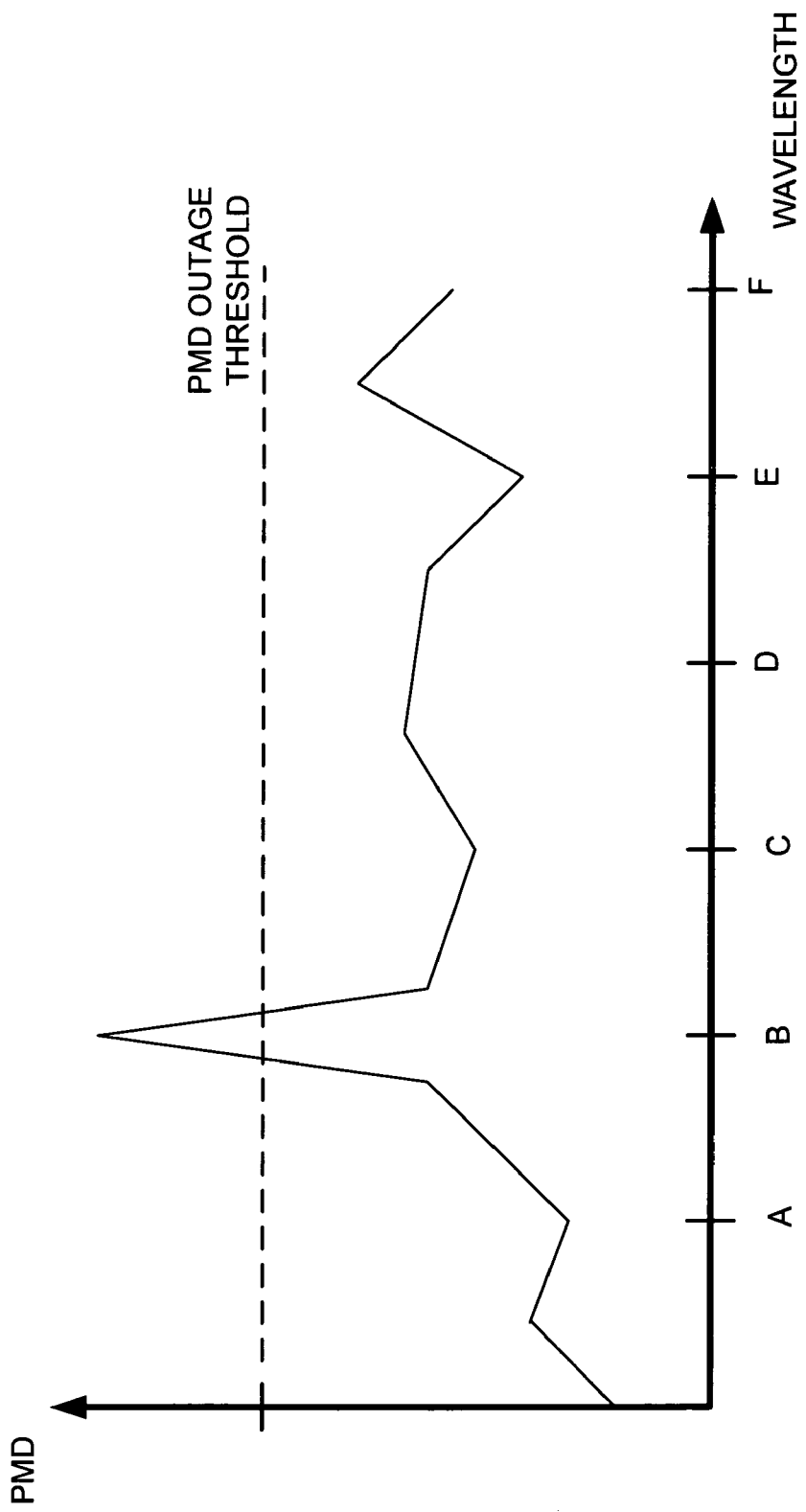
FIG. 3 illustrates PMD outage wavelength dependency in an example of the invention.
Figure 4:
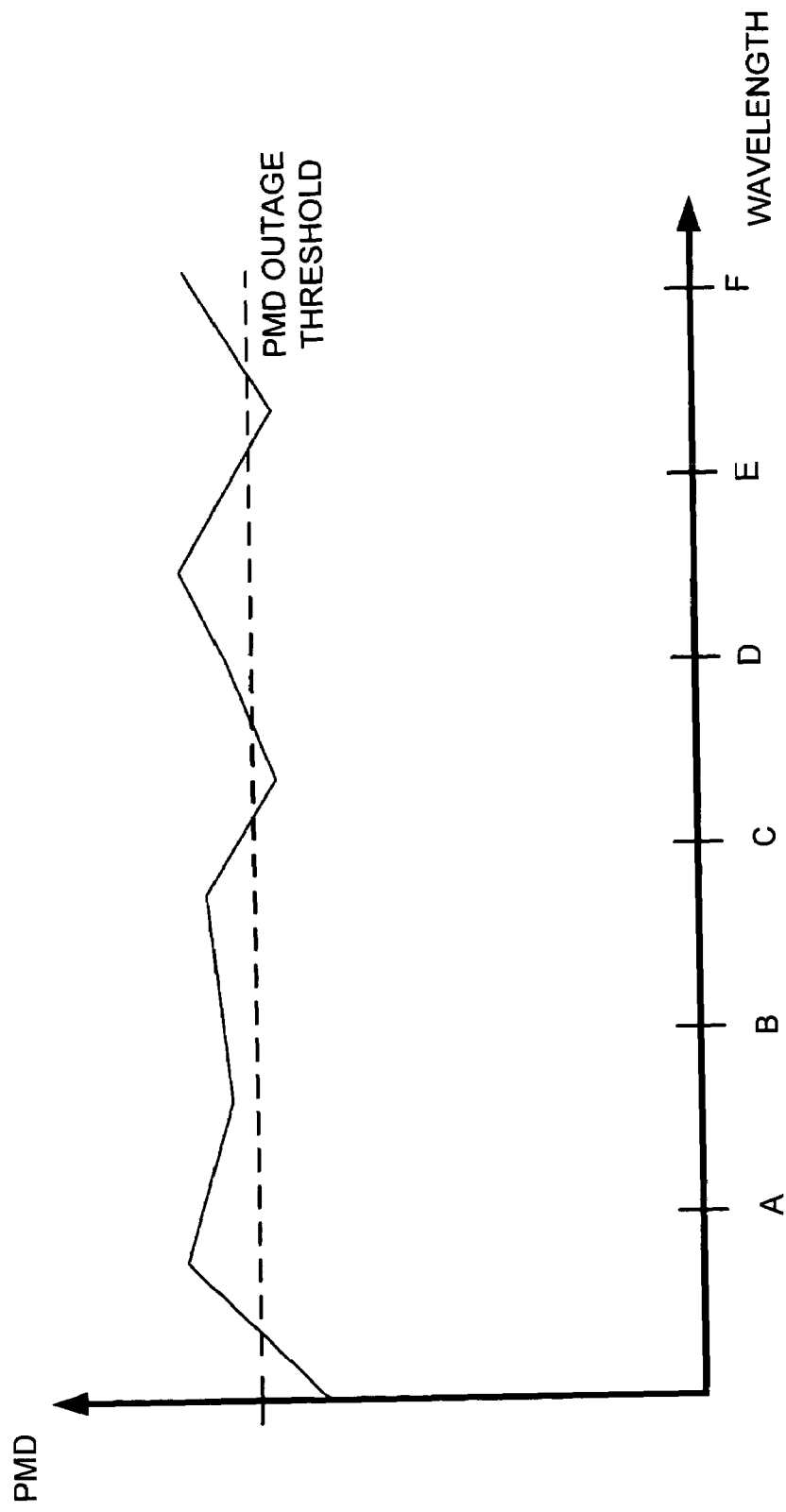
FIG. 4 illustrates PMD outage wavelength independency in an example of the invention.

FIGS. 3–4 illustrate wavelength dependency for a PMD outage in an example of the invention. Both FIGS. 3–4 are graphs with wavelengths A–F listed along the horizontal axis and PMD magnitude listed along the vertical axis. Although the graphs are simplified for illustrative purposes, optical communications wavelengths are typically measured in nanometers, and PMD is typically measured by Differential Group Delay (DGD). DGD is typically measured in picoseconds. Thus, FIGS. 3–4 indicate PMD magnitude at wavelengths A–F.

FIGS. 3–4 also have a PMD outage threshold noted on the PMD axis. The PMD outage threshold is set at a point where PMD becomes severe enough to inhibit optical receiver 102 from recovering the communication signals from the optical signals. Since PMD (measured by DGD) causes bit errors (measured by BER), testing can correlate a BER that reaches the outage level with the measured DGD that caused the BER. The PMD outage threshold is set at the measured DGD value that correlates to the outage-level BER. For example, testing may reveal that the BER reaches outage status, such as BER of $10^{-3}$, when the measured DGD reaches 30 picoseconds, so the PMD outage threshold is set at 30 picoseconds of DGD.

The PMD outage threshold can be used to determine if a PMD outage has occurred. Other suitable techniques of identifying the PMD outage could also be used. Examples of such techniques are given in U.S. patent application Ser. No. 10/299,675, entitled "Identifying a Polarization-Mode Dispersion Event", filed on Nov. 19, 2002; and U.S. patent application Ser. No. 10/621,858, entitled "Identification of Polarization-Mode Dispersion on a Communication Network", filed on Jul. 17, 2003. Both of these U.S. Patent Applications are hereby incorporated by reference into this patent application.

The PMD outage is wavelength dependent if the outage is present at substantially one wavelength for the optical signals, but is not present at other wavelengths for the optical signals. On FIG. 3, the PMD outage is present at wavelength B, but is not present at the other wavelengths A or C–F. Thus, the PMD outage on FIG. 3 is wavelength dependent. In contrast on FIG. 4, the PMD outage is substantially present at multiple wavelengths, so the PMD outage of FIG. 4 is not wavelength dependent.

The term wavelength is used in its optical communications context, such as a 1550 nanometer (nm) wavelength. Those skilled in the art are aware that a light pulse comprises energy within a wavelength band around a center wavelength, such the 1540 nm wavelength. Two wavelength bands that carry respective communication signals are separated by an unused wavelength band that provides a buffer between the two operating wavelength bands. In the context of the invention, a wavelength refers to a wavelength band that carries a communication signal.

Figure 5:
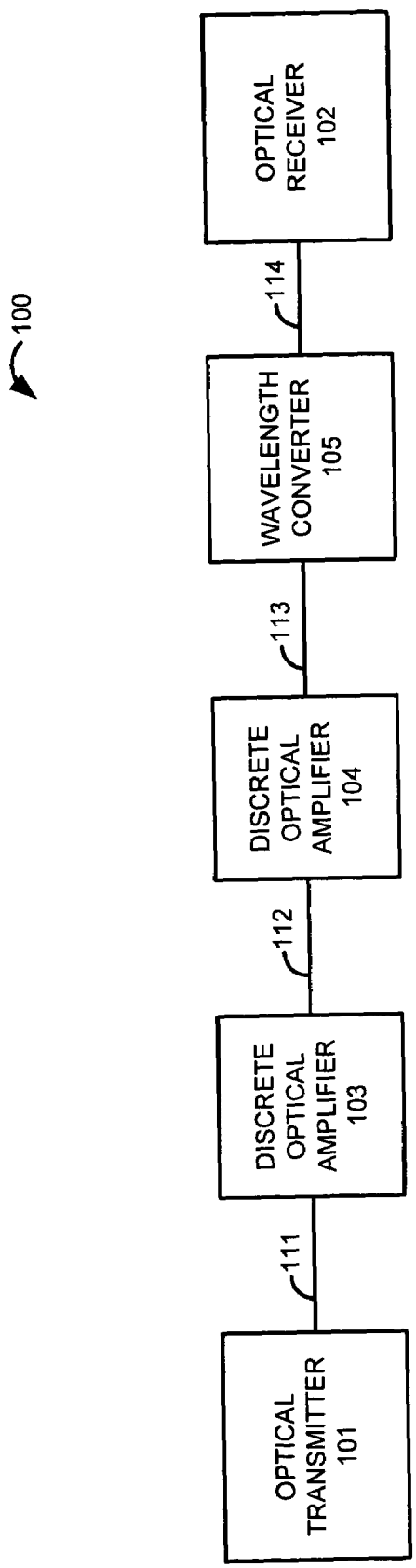
FIG. 5 illustrates an optical fiber route in an example of the invention.

FIG. 5 illustrates optical fiber route 100 in an example of the invention. FIG. 5 shows that wavelength converter 105 is added between optical fiber 113 and optical receiver 102. Optical fiber 104 couples wavelength converter 105 to optical receiver 102. Thus, wavelength converter 105 is installed proximate to optical receiver 102. Proximate means that wavelength converter 105 and optical receiver 102 are located at the same physical site or facility. If desired, wavelength converter 105 could be integrated within optical receiver 102, and possibly within the WDM components of optical receiver 102. Alternatively, wavelength converter 105 could be integrated within discrete optical amplifier 104.

FIG. 6 illustrates optical fiber route 100 in an example of the invention. FIG. 6 shows that distributed Raman amplifiers 106–107 are added to respective optical fibers 111 and 113. As discussed above, distributed Raman amplifier 106 is added first to the optical fiber with the highest loss, and distributed Raman amplifier 107 is added second to the optical fiber with the second highest loss.

To add distributed Raman amplifier 106 to optical fiber 111, an optical splitter (indicated by a dot on FIG. 6) is added to optical fiber 111 at its termination on discrete optical amplifier 103. One output of the optical splitter is coupled to discrete optical amplifier 103, and the other output of the optical splitter is coupled to distributed Raman amplifier 106. To generate Raman amplification on optical fiber 111, distributed Raman amplifier 106 backward pumps light into optical fiber 111 from the receiving end at discrete optical amplifier 103 toward the transmitting end at optical transmitter 101. Distributed Raman amplifier 107 could be installed in a similar manner.

Advantageously, the above-described invention mitigates PMD outages to provide more reliable optical fiber routes, and the more reliable routes provide better communication service. In addition to the advantage of mitigating PMD outages, the addition of distributed Raman amplifiers to an optical fiber route may provide enough amplification to avoid the complex and expensive task of installing a regeneration site. The addition of distributed Raman amplifiers to an optical fiber route may also provide enough amplification to extend the length of an optical fiber route before a regeneration site is required.

In an alternative example of the invention, wavelength conversion components are installed near the optical receiver on an optical fiber route—possibly integrated within an optical amplifier or optical receiver. A computer system is coupled to the wavelength conversion components. The computer system automatically monitors the optical fiber route and implements steps 201–204 of FIG. 2. To "add" the wavelength converter, the computer system would direct the existing wavelength conversion components to convert wavelengths affected by PMD outages to different wavelengths. If a PMD outage were to persist, then the computer system would generate an alarm.

What is claimed is:

1. A method of handling a Polarization Mode Dispersion (PMD) outage for optical signals on an optical fiber route between an optical transmitter and an optical receiver, the method comprising:
   determining that the PMD outage has occurred on the optical fiber route;
   in response to determining that the PMD outage has occurred, determining if the PMD outage is wavelength dependent; and
   in response to determining that the PMD outage is wavelength dependent, adding a wavelength converter to the optical fiber route, wherein the wavelength converter converts one of the optical signals from an optical wavelength affected by the PMD outage to a different optical wavelength.

2. The method of claim 1 further comprising:
   determining if the PMD outage is still present after adding the wavelength converter; and
   in response to determining that the PMD outage is still present after adding the wavelength converter, adding a distributed Raman amplifier to the optical fiber route, wherein the distributed Raman amplifier uses a Raman effect to amplify the optical signals.

3. The method of claim 2 further comprising:
  determining if the PMD outage is still present after adding the distributed Raman amplifier; and
  in response to determining that the PMD outage is still present after adding the distributed Raman amplifier, adding another distributed Raman amplifier to the optical fiber route.

4. The method of claim 3 wherein the optical fiber route is comprised of a plurality of optical fibers coupled together by a plurality of optical amplifiers to form the optical fiber route between the optical transmitter and the optical receiver, and wherein adding the distributed Raman amplifier to the optical fiber route comprises determining one of the optical fibers having a highest loss and adding the distributed Raman amplifier to the one optical fiber having the highest loss.

5. The method of claim 1 further comprising, in response to determining that the PMD outage is not wavelength dependent, adding a distributed Raman amplifier to the optical fiber route, wherein the distributed Raman amplifier uses a Raman effect to amplify the optical signals.

6. The method of claim 5 further comprising:
  determining if the PMD outage is still present after adding the distributed Raman amplifier; and
  in response to determining that the PMD outage is still present after adding the distributed Raman amplifier, adding another distributed Raman amplifier to the optical fiber route.

7. The method of claim 5 wherein the optical fiber route is comprised of a plurality of optical fibers coupled together by a plurality of optical amplifiers to form the optical fiber route between the optical transmitter and the optical receiver, and wherein adding the distributed Raman amplifier to the optical fiber route comprises determining one of the optical fibers having the highest loss and adding the distributed Raman amplifier to the one optical fiber having the highest loss.

8. The method of claim 1 wherein adding the wavelength converter to the optical fiber route comprises adding the wavelength converter proximate to the optical receiver.

9. The method of claim 1 wherein the wavelength converter reduces noise in the one optical signal.

10. The method of claim 1 wherein adding the wavelength converter to the optical fiber route comprises determining the optical wavelength affected by the PMD outage and configuring the wavelength converter to convert the one optical signal from the optical wavelength affected by the PMD outage to a different optical wavelength.

11. The method of claim 1 wherein the optical fiber route operates at 10 gigabits per second or higher.

12. The method of claim 1 wherein the optical fiber route operates at 40 gigabits per second or higher.

* * * * *